United States Patent [19]

Luker

[11] Patent Number: 4,871,602
[45] Date of Patent: Oct. 3, 1989

[54] FLOOR MAT WITH BAND OF HIGHER DENSITY TUFTING

[76] Inventor: Ken Luker, 6209 Rockinghorse Way, Orange, Calif. 92669

[21] Appl. No.: 212,886

[22] Filed: Jun. 29, 1988

[51] Int. Cl.⁴ ............................................. B32B 33/00
[52] U.S. Cl. ...................................... 428/88; 156/72; 428/95
[58] Field of Search ...................... 428/88, 95, 85, 92; 156/72

[56] References Cited

U.S. PATENT DOCUMENTS

| | | | |
|---|---|---|---|
| 1,426,296 | 8/1922 | Kerr | 74/564 |
| 1,680,442 | 8/1928 | Anderson | 74/564 |
| 1,809,706 | 6/1931 | Jamieson | 428/79 |
| 1,999,441 | 4/1935 | Clark | 156/88 |
| 2,136,980 | 11/1938 | Pim | 74/564 |
| 2,444,342 | 6/1948 | Edwards | 180/90 |
| 2,777,789 | 1/1957 | Smith | 428/116 |
| 3,042,564 | 7/1962 | Hankins | 156/72 |
| 3,114,272 | 12/1963 | Sawyer | 74/564 |
| 3,133,908 | 5/1964 | Hankins | 156/88 |
| 3,703,424 | 11/1972 | Charnock et al. | 428/88 |
| 3,836,412 | 9/1974 | Terry et al. | 428/88 |
| 3,895,981 | 7/1975 | Tesch | 156/71 |
| 4,262,048 | 4/1981 | Mitchell | 428/99 |

Primary Examiner—Marion C. McCamish
Attorney, Agent, or Firm—Knobbe, Martens, Olson & Bear

[57] ABSTRACT

A vehicle floor mat is provided with a high density, long-wearing heel engaging band, wherein the band is formed integral with and simultaneously with the remainder of the mat. This is accomplished by employing double tufting in a band of an elongated strip of carpeting to provide the high density area.

13 Claims, 1 Drawing Sheet

U.S. Patent  Oct. 3, 1989  4,871,602
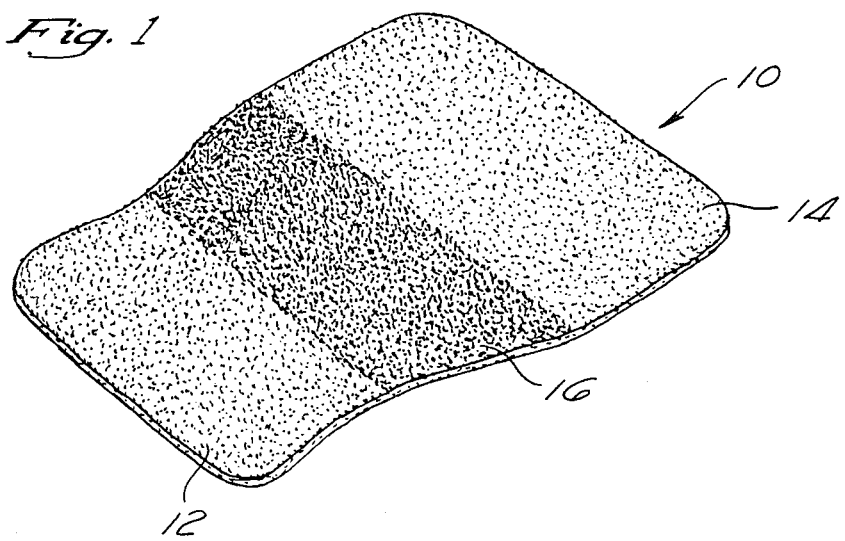
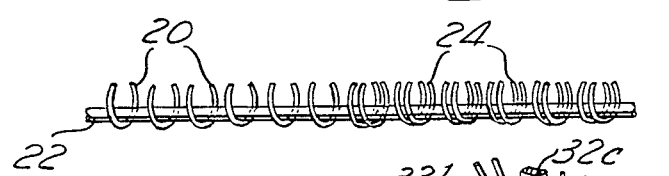
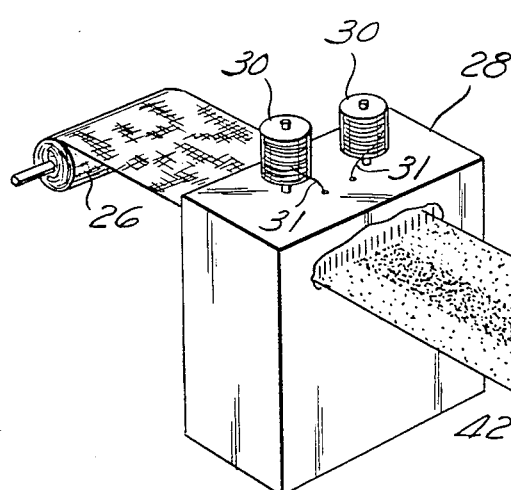
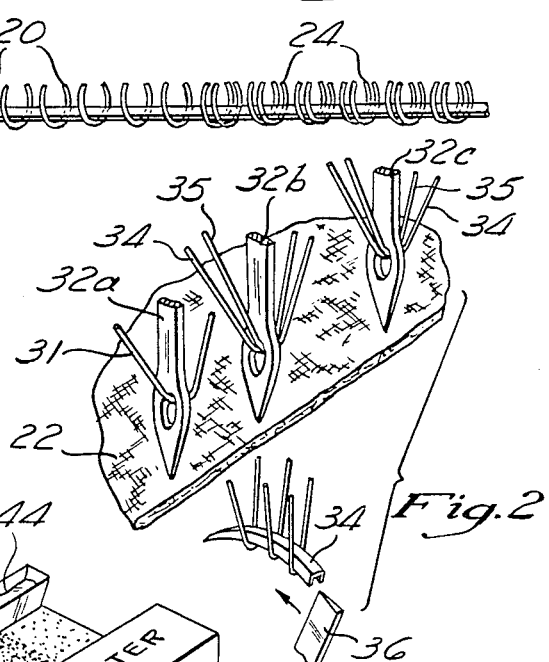
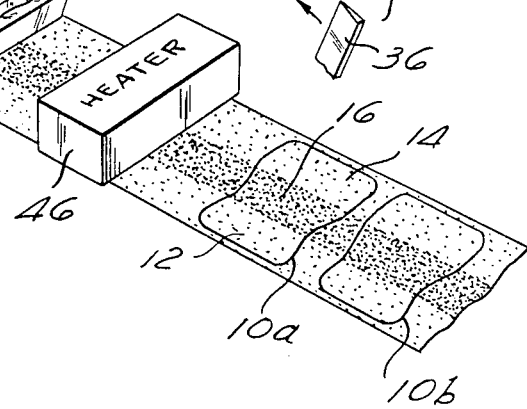
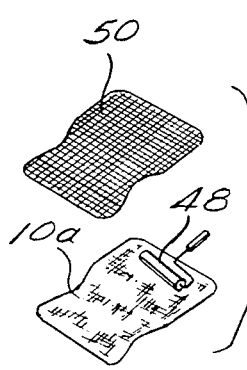

FLOOR MAT WITH BAND OF HIGHER DENSITY TUFTING

FIELD OF THE INVENTION

This invention relates to floor mats, particularly useful as vehicle mats to be placed beneath the feet of the driver to provide extra protection in that area.

BACKGROUND OF THE INVENTION

As is well known, the area on a vehicle floor carpet adjacent the accelerator pedal becomes worn by the driver's heel much sooner than other areas of the carpet. To a lesser extent, excess wear is often also seen adjacent the clutch pedal in a vehicle having a manual shift.

Because of these wear patterns, many original equipment vehicle carpets are provided with some sort of rubber or similar reinforcement pad in the high wear area of the carpet. In addition, separate mats are utilized by most vehicle owners to protect the original carpet. Many vehicle owners employ several sets of floor mats during the life of a vehicle. Most of these mats have a rubberized area to receive the heel wear. In another approach, a pad of high wear carpet is bonded or otherwise secured to the original mat or carpet in the high wear area.

A search through the existing U.S. patents has uncovered a large number of very early patents, as well as a few more recent ones directed to various mat constructions employing improvements in that area. These include U.S. Pat. Nos.: 1,426,296; 1,680,442; 1,809,706; 1,999,441; 2,136,980; 2,444,342; 2,777,789; 3,042,564; 3,114,272; 3,703,424; 3,895,981; and 4,262,048.

In spite of all the efforts in this area, needs still exist for improvements in appearance, quality and cost of floor mats.

SUMMARY OF THE INVENTION

Briefly stated, the invention comprises a vehicle floor mat having a primary section of tufted carpeting of a selected density and a band of the same carpeting of greater density which is originally fabricated integral with the primary section. Preferably, the tufting is doubled in the high density section. The dense section is, of course, located in the area of highest wear, while the forward and rearward portions of a floor mat may be of single tufting density.

In accordance with the method of the invention, the tufting needles for the dense section are fed with two strands of yarn in the area to be dense, whereas the other portions of the mat are made with the customary one yarn per needle. Preferably, one linear section of a roll or endless strip of carpeting is double tufted, with that section being spaced inwardly from the edges of the strip so that an area of single tufting is on each side of the double tufted area. The carpeting is then cut into mats with the length of the mat extending across the carpet strip. This positions the dense section of the mat extending completely across the mat with the remaining portions being of single tufting.

One of the advantages of the method is that the denser section can be made of the same yarn as the less dense section and is not easily noticeable. However, a further advantage from a flexibility standpoint is that different types or colors of yarn can be used for the dense area if desired. Perhaps the greatest advantage is reduced cost in relation to other mats in view of the fact that the high density area is formed integral and simultaneously with the less dense sections so that additional fabrication steps are not required. A long-wearing, highly functional product is obtained without any sacrifice in appearance from the original carpet.

BRIEF DESCRIPTION OF THE DRAWINGS

FIG. 1 is a perspective view of the mat of the invention.

FIG. 2 is a schematic perspective view illustrating the manner in which double tufting is provided.

FIG. 3 is an enlarged cross-sectional view on line 3—3 of FIG. 1.

FIG. 4 is a perspective schematic view illustrating a portion of the method used in making the mat carpeting and the mat itself.

FIG. 5 is a perspective schematic view of additional steps in the fabricating of the mat of the invention.

DETAILED DESCRIPTION OF THE PREFERRED EMBODIMENT

A mat 10 shown in FIG. 1 has a shape which has been cut to fit within the floor board area of a typical vehicle in the space normally occupied by the driver's feet. This includes a main forward section 12, a main rear section 14 and a central high wear band 16 that extends transversely from side to side of the mat, between the front and rear sections. The forward and rear sections 12 and 16 have a single tufted carpeting construction, and the central band has double tufted carpeting construction, but the central band is formed integral with and simultaneously with the forward and rear sections.

This is schematically illustrated in FIG. 3 wherein a portion of the forward or rear section is shown with single U-shaped cut piles 20 extending through a backing 22, while the adjacent central band shows twice as many cut piles 24 extending through the same backing 22.

The preferred method of making the carpet and the mats is partially illustrated in FIG. 4 wherein a roll of suitable backing 26 is shown being fed through a cut pile tufting machine 28. The backing may be any suitable, conventional backing available in the market for making tufted carpeting. Such backing typically has interwoven or interconnected strands forming a matrix or substrate to which loops of carpet yarn may be attached. One suitable material currently being used in production of the mats of the invention is polypropylene FLW, which is available from Amoco. The backing typically comes in elongated strips wound in a roll as illustrated, and is then fed linearly through the tufting machine. Preferably, the width of the strip is just slightly greater than the length of the floor mat to be made.

The tufting machine is illustrated schematically in that such apparatus is well known to those skilled in the art, and any conventional, commercially available tufting apparatus may be utilized. Such apparatus typically includes a row of equally spaced tufting needles that extend across the width of the backing and reciprocate vertically as the backing is drawn beneath the needles. Carpet yarns 31 for each of the needles is fed from a plurality of spools 30, two of which are schematically illustrated in FIG. 4. Three of the needles 32 are illustrated schematically in FIG. 2. As the needles reciprocate through the backing, a hook 34 for each needle captures the yarn from the needle to form the loops. A series of hooks are mounted on a common shaft and move in a path synchronized with the reciprocation of the needles. The loops extend downwardly from the backing, as viewed in FIGS. 2 and 4, which is opposite to that of FIGS. 1 and 3.

As is well known, tufted carpets can be left in their loop form or they can be cut. Cut piles are shown in FIG. 3. This is accomplished by a schematically illustrated blade 36 associated with the hook 34. A series of blades, one for each hook, are mounted on a common shaft and moved in an arcuate path to cut one loop at a time on its associated hook. As is well known to those skilled in the art, there are usually three loops on a hook at one time, and, as another is to be added, the loop most remote from the tip of the hook is cut.

In conventional "plush" carpet tufting operations, a single strand of yarn is usually used with each needle. However, it is understood that two yarns of different colors have been used in a single needle in the making of multi-color shag carpeting. The single yarn 31 per needle is shown for needle 32a in FIG. 2, while two yarns 34, 35 per needle are shown for needles 32b and 32c in FIG. 2. The needles having a single yarn are utilized for forming the outer section of the strip of carpeting shown in FIG. 4, while the needles having the double yarn are used for making the double tufting central band. In the area of double tufting, there are two loops for each reciprocation of the needle; there are six loops on each hook at one time; and two loops are cut at one time.

With this simple approach, the desired high density band is created. It should be noted that no adjustments are required to the standard tufting machine, that the only requirement is to maintain two yarns in the needles for the central band. Even providing the necessary double yarn approach is accomplished relatively simply with the tufting apparatus, in that, typically, two spools of yarn are provided in the yarn-feeding apparatus for each needle, one serving as the primary feed and the other serving as a backup when the first is completed. With the double tufting approach, the backup spool provides the second yarn needed, such that even the spool mounting apparatus with a conventional tufting apparatus need not be modified.

The width of the double tufting band can, of course, be selected as desired merely by increasing or decreasing the number of needles being provided with two yarns at one time. Similarly, the location of the double tufted band can be readily adjusted as desired in the same manner.

After the tufting step is completed, a coating of latex is applied to the backside of the now-tufted backing 22, the backing being up, as illustrated in FIG. 4. This is a usual step in the formation of tufted carpeting. The latex may be applied in any conventional manner. In FIG. 4, the latex application is schematically illustrated by the showing of a trough 42 extending across the width of carpet with latex 44 being positioned in the trough to flow evenly onto the in-process carpet strip 38 as it is moved beneath the trough. In another approach, the latex is maintained in a flowable mound on the in-process carpet, with the latex engaging a spreader that evenly spreads a thin coating of latex across the entire backside surface of the carpet. Following the latex-applying step, the carpet is passed through a furnace or other suitable heater 46 to cure the latex and bond the tufts of yarn to the backing.

An additional backing layer can be applied to the tufted first backing prior to the step of applying latex if desired. With this approach, the latex is applied to both backing layers at the same time. Further, it is possible to have two backing layers fed through the tufting apparatus and have the tufting formed integral with both backing layers. In a preferred form of the invention, however, only a single backing is used prior to the curing step. Following the curing step, the carpet is ready to be cut into the floor mat shape by a suitable die, two mats 10a and 10b are schematically illustrated in FIG. 4, being cut from the carpet strip.

As a final step, a second layer of latex is applied to the backside of the carpet by a roller 48 or other suitable means, and a layer 50 of non-slip rubberized mesh cut to the shape of a carpet is applied to the latex. The mat is then once more placed in a suitable heater for curing the latex. If an additional backing layer is desired, as in some cases, that backing layer may be similarly applied by utilizing a layer of latex and then placing the backing on the latex and curing it. The non-slip mesh would always represent the last layer of material since it is desired that the non-slip surface be the side of the carpet which faces downwardly to engage the flooring material in a vehicle. After the non-slip mesh is applied, it is only necessary to add a finishing edge material (not shown) to the edges of the carpet to prevent fraying.

Another reason for cutting the mats from the original carpet strip before the non-slip mesh is to be applied is that frequently custom embroidering is desired on vehicle floor mats. To facilitate the embroidering operation, it is preferable that such work be performed before the carpet is thickened by the non-slip mesh or by any additional backing-applying steps.

Based on the foregoing, it can be seen that a floor mat with a high density band to withstand heel wear is readily provided with the double tufting approach. By forming this denser area integrally with the less dense sections, there is no risk of separation and there is no need for costly extra steps which are common to the prior art approach. As is explained above, the integral double tufting approach is also very versatile. It has the advantage that if the same yarn is used for the double tufting band as with the other sections, the product visually appears uniform throughout such that the user of the mat is not even aware of the denser band, and yet the user has the benefit of the increased wear life in that area. On the other hand, by selecting yarn of a different color or different material for the dense area, that area can be highlighted if desired.

If greater density is desired in the high density area, it may be possible to employ more than two yarns per needle, although this has not been tried, in that two appears to be quite satisfactory. Related to this, yarns of different density could theoretically be employed to achieve a desired integrally and simultaneously formed dense area for a floor mat. That is, perhaps a single yarn could be used in the high density area if the yarn itself is denser or has more bulk than the yarn used for the other sections of the mat. Possibly, other variations of yarn density versus the number of yarns per needle may be useful; however, from the standpoint of a desirable finished product and the standpoint of using existing carpet tufting apparatus, the primary approach described is believed to be preferable.

In theory, tufting needles could be placed closer together in an area where increased tufting density is desired, but this would require modifications to the tufting apparatus. On the of the advantages of the invention is that standard tufting machines are employed, which helps keep the cost low.

What is claimed is:

1. A floor mat, comprising a primary section of carpeting of a selected density, and a band of carpeting of greater density formed integral with and simultaneously with said primary section to form an area to withstand increased wear.

2. The mat of claim 1, wherein said carpeting includes a backing layer with carpet tufting secured thereto, wherein the tufting is of greater density in said band than in said primary section.

3. The mat of claim 1, wherein the mat is shaped to serve as a floor mat in a vehicle in the area occupied by the driver's feet, and said band extends transversely across the entire width of the mat and is located so the driver's heel will normally engage said band when the driver's foot is on the vehicle acceleration pedal.

4. The mat of claim 1, wherein said mat section has single tufting and said band has double tufting to provide the increased density.

5. The mat of claim 1, including a backing support layer with tufts of carpet yarn being looped through said backing, with the tufting in the area of said band being formed by double strands of yarn, whereas the tufting in said main section is formed by single strands.

6. A vehicle floor mat having a forward edge to extend toward the front of a vehicle, a rear edge extending toward the front seat of the vehicle, and side edges extending between the front and rear edges, said mat having a forward section and a rear section formed of single tufted carpeting, and a central band of double tufted carpeting formed integral with the front and rear sections, and extending transversely across the mat from one side to the other, said band being sized and located to include an area adapted to be positioned such that the driver,s heel normally engages the high density double tufting.

7. The mat of claim 6, including a backing layer which is integral with said single tufted sections and said double tufted band.

8. An elongated strip of carpeting, comprising: a backing layer;
carpet tufting extending through said backing layer; and
a layer of cured latex securing said tufting to said backing, said elongated strip having side sections extending throughout the length of the strip and a central band extending throughout the length of the strip and being bordered by the side sections, the tufting of the central band being denser than the tufting in the side sections.

9. The carpeting of claim 8, wherein said central band is twice as dense as the side sections.

10. The carpeting of claim 8, wherein said central band has twice as many tufts per unit area as does said side sections.

11. A method of making a mat, comprising the steps of:
passing an elongated strip of carpet backing through carpet tufting apparatus;
installing carpet tufting of one density into primary sections of said backing; and
installing a band of carpet tufting of greater density into said backing between said sections, said installing steps being performed simultaneously whereby an elongated strip of carpeting of one density is formed integral with and simultaneous with the elongated band of increased density.

12. The method of claim 11, including cutting sections of said carpeting into the shape of vehicle floor mats with the high density band extending transversely across the mat, and the forward and rear sections of the mat being formed from the single tufted carpet sections.

13. The method of claim 11, wherein said installing steps include positioning a single strand of yarn into the tufting needles used to form said sections and positioning two strands of yarn in the tufting needles used to form said band.

* * * * *